United States Patent [19]
Saito

[11] Patent Number: 5,838,363
[45] Date of Patent: Nov. 17, 1998

[54] IMAGE READING DEVICE AND IMAGE RECEIVING DEVICE

[75] Inventor: Osamu Saito, Asaka, Japan

[73] Assignee: Fuji Photo Film Co., Ltd., Kanagawa, Japan

[21] Appl. No.: 780,229

[22] Filed: Jan. 8, 1997

[30] Foreign Application Priority Data

Jan. 9, 1996 [JP] Japan ................................. 8-001309
Dec. 25, 1996 [JP] Japan ................................. 8-346092

[51] Int. Cl.⁶ .......................... H04N 5/253; H04N 3/36
[52] U.S. Cl. ............................................ 348/96; 348/97
[58] Field of Search .............................. 348/96, 97, 98, 348/231, 232; 358/527, 487, 403, 404, 437; 355/40, 41, 18; 396/129, 311, 429, 409; H04N 5/253, 3/36

[56] References Cited

U.S. PATENT DOCUMENTS

| | | | |
|---|---|---|---|
| 4,482,926 | 11/1984 | Brownstein | 358/302 |
| 5,457,491 | 10/1995 | Nowry | 348/104 |
| 5,469,209 | 11/1995 | Gunday et al. | 348/96 |
| 5,541,644 | 7/1996 | Namba | 348/96 |
| 5,548,327 | 8/1996 | Gunday et al. | 348/97 |

FOREIGN PATENT DOCUMENTS 2-257782   10/1990   Japan   ................................ H04N 7/14

*Primary Examiner*—Richard Lee
*Assistant Examiner*—Tung T. Vo
*Attorney, Agent, or Firm*—Sughrue, Mion, Zinn, Macpeak & Seas, PLLC

[57] ABSTRACT

The image reading device scans film images on photographic film by a CCD line sensor, and transfers image data, which are read out from the CCD line sensor, to an external image receiving device via a line buffer. If a data receiving side comes into a busy state and the data cannot be transferred for some time, the line buffer overflows. When an overflow detecting section detects the overflow, the writing of the image data in the line buffer is stopped, so that the film images can be scanned again. While the film images are scanned again, a communication controller detects image data corresponding to the image data when the overflow is detected, so that the writing of the image data in the line buffer can be resumed from a point when the correspondence is detected.

14 Claims, 10 Drawing Sheets

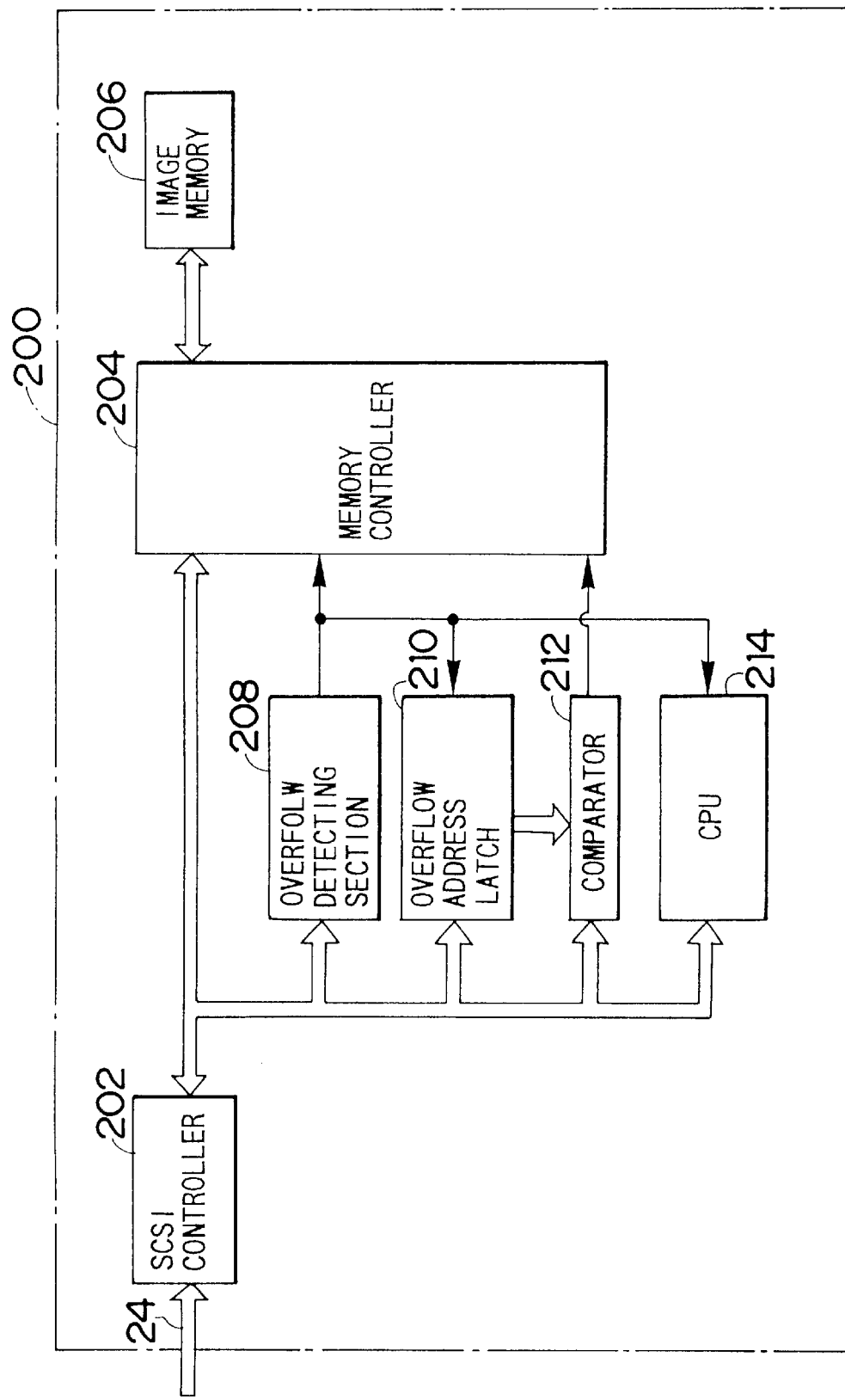
F I G. 5

F I G. 7(A)

| ADDRESS | RECEIVED DATA |
|---|---|
| 0 | XXXXXXXX |
| 1 | XXXXXXXX |
| 2 | XXXXXXXX |
| ...... | ...... |
| N | XXXXXXXX |

F I G. 7(B)

| ADDRESS | RECEIVED DATA | PARITY |
|---|---|---|
| 0 | XXXXXXXX | XXXX |
| 1 | XXXXXXXX | XXXX |
| 2 | XXXXXXXX | XXXX |
| ...... | ...... | ...... |
| N | XXXXXXXX | XXXX |

F I G. 8
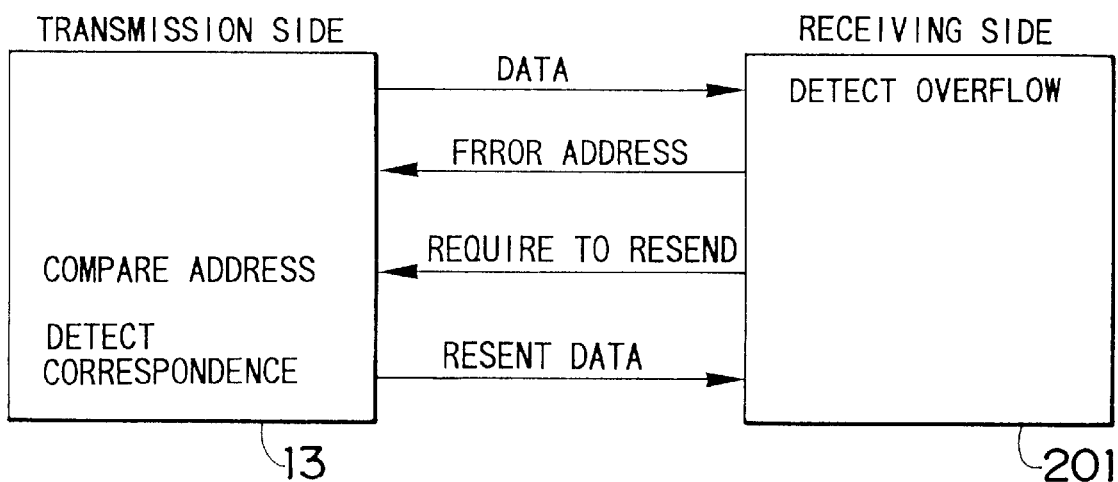

IMAGE READING DEVICE AND IMAGE RECEIVING DEVICE

BACKGROUND OF THE INVENTION

1. Field of the Invention

The present invention relates to an image reading device and an image receiving device. More particularly, the present invention relates to an image reading device for picking up a still image and transmitting image data of the picked-up image, and an image receiving device such as a personal computer for receiving the image data transmitted from the image reading device.

2. Description of the Related Art

FIG. 9 illustrates the conventional photographic film.

A film cartridge 110 shown in FIG. 9 has a single spool 112, and the photographic film 114 is wound around the spool 112. Perforations 114A are punched in the photographic film 114 to indicate the position of each frame. The perforations 114A are detected in a film transporting device such as a camera, a film scanner, etc., so that the position of each frame can be detected, the feeding of the frame can be controlled, or the like.

A magnetic recording layer 114B is formed at the edge of the photographic film 114. The magnetic data indicating the photographing data of each frame, etc. can be recorded in the magnetic recording layer 114B.

The developed photographic film 114 is wound up by the film cartridge 110, so that the film 114 can be housed. The film image recorded on the developed photographic film 114 is regenerated in the image reading device such as the film scanner. In an image reading device, an imaging element picks up the film image recorded on the photographic film, and the image data read out from the imaging element are transferred to an image receiving device such as a personal computer, and the film image is displayed on a monitor of the personal computer, etc.

FIG. 10 shows the inner structure of the image reading device.

The image reading device 90 in FIG. 10 has a film transporting mechanism 92 that transports the developed photographic film 114 housed in the film cartridge 110 at a predetermined speed, and the image reading device 90 reads the film image recorded on the photographic film 114 by means of a CCD line sensor 94.

The CCD line sensor 94 is constructed in such a manner that the imaging element is arranged in a direction perpendicular to the feed direction of the photographic film 114. The CCD line sensor 93 sequentially reads the film images in a line perpendicular to the feed direction.

In an analog processing circuit 96, a variety of signal processes are performed for the image data read out from the CCD line sensor 94, and then an A/D converter 98 converts the image data into digital signals. The image data are recorded in an image memory 102 having a large capacity via a memory controller 100. Thereafter, the memory controller 100 sequentially reads out the image data recorded in the image memory 102, and the readout image data are transferred to an external image receiving device 108 via a communication controller such as a small computer system interface (SCSI) controller 104. A central processing unit (CPU) 106 controls each circuit in the image reading device 90. In the CPU 106, the transport of the photographic film 114 is controlled by the film transporting mechanism controller 92; the image data are stored in the image memory 102 via the memory controller 100; and the image data stored in the image memory 102 are transmitted to the SCSI controller 104 under instructions sent via the SCSI controller 104.

The image reading device has an image memory which is capable of recording all image data of the film images which are recorded on the photographic film 114, and records the scanned image data first in the image memory, and reads out the image data from the image memory so that the image data can be transferred to the external image receiving device. Thereby, the scanning speed and the data transmission speed can be controlled as desired.

The conventional image reading device in FIG. 10, however, is expensive because it requires a large capacity of the image memory.

On the other hand, if the image memory is not mounted in the image reading device, the image data must be read out from the CCD line sensor at a speed corresponding to the data transmission speed, but such process is complicated so far as the control is concerned. Thus, in this case, there is a disadvantage in that the data transmission speed must be extremely low in order to prevent an overflow in the communication.

The personal computer may be used as the external image receiving device operated by a multitask operation system (OS), etc. However, in the multitask OS, the image cannot be received with a constant communication capacity being secured while another processing is being performed. For this reason, the communication overflow cannot always be prevented.

When the communication overflow occurs, the image data at this time are missing, and the image data cannot be transferred normally. When the communication error occurs, the same problem occurs. In order to keep the image data, it is desirable that the image data have no missing parts.

On the other hand, Japanese Patent Provisional Publication No. 2-25778 discloses that image data when the overflow takes place in the communication are interpolated by another image data in order to solve the problem of the communication overflow. That is, in an integrated service digital network (ISDN) image communication method, when the transmission buffer memory overflows, an image signal provided with a specific number as a line number (overflow flag) is transmitted, and the receiving side detects the flag. Then, abnormal image signals are detected by means of the flat, and the abnormal image signals are not displayed on the display screen. Normal image signals interpolate the abnormal image signals, and they are displayed on the display screen.

In the invention disclosed in Japanese Patent Provisional Publication No. 2-257782, however, there must be a special agreement between the data transmitting side and the data receiving side that the image signals are interpolated to be displayed; thus, this invention is not suitable for an ordinary interface and the above-mentioned image reading device using an image display, etc.

SUMMARY OF THE INVENTION

The present invention has been developed under the above-described circumstances, and has its object the provision of an inexpensive image reading device which prevents image data from being lost due to the communication overflow, when the image reading device transfers the image data to an external image receiving device.

There is another object of the present invention to provide an image receiving device which is capable of receiving image data well even if the communication overflow occurs in the image reading device, when the image receiving device receives the image data from the image reading device.

In order to achieve the above-mentioned object, the present invention comprises: an image reading means for reading an image and outputting image data indicating the read image; a transmission buffer for temporarily containing the image data outputted from the image reading means; an overflow detecting means for detecting overflow of the buffer; a communication controlling means including a buffer controlling section for writing, in the buffer, the image data outputted from the image reading means and sequentially reading out the image data from the buffer in an order in which the image data are written in the buffer, and communicating with an external image receiving device to transmit the image data to the image receiving device via the buffer; an image data position detecting means for detecting a position of the image data when the overflow is detected among all transmitted image data, when the overflow detecting means detects the overflow of the buffer; a controlling means for having the image reading means resume reading the same image as the read image, when the overflow detecting means detects the overflow of the buffer; a correspondence detecting means for detecting a correspondence point where the image data outputted from the image reading means correspond to image data at the image data position detected by the image data position detecting means; and in the present invention, the buffer controlling section stops writing the image data in the buffer when the overflow detecting means detects the overflow of the buffer, and resumes writing the image data in the buffer from the image data at the correspondence point detected by the correspondence detecting means when the image is read again.

According to the present invention, the image data indicating the image read by the image reading means are sequentially written in the buffer, and the image reading means communicates with the external image receiving device so that the image data written in the buffer can be sequentially read out. In this case, when the overflow of the buffer is detected, the position of the image data when the overflow is detected among all transmitted image data is detected, and the image reading means reads the image again. While the image is read again, the correspondence point when the read image data and the image data at the detected image data position is detected, and the writing of the image data in the buffer is resumed from the image data at the correspondence point, and the transmission of the data is resumed, too.

Thus, even if the communication overflows occurs during the transmission of the image data, all image data with no missing part can be transferred to the image data. Moreover, the image reading device which is constructed in the above-mentioned manner can be realized at a low cost without requiring an image memory for recording all image data of the image.

Furthermore, according to another mode of the present invention, an image data holding means is provided instead of the image data position detecting means in order to hold the image data of predetermined lines just before the overflow is detected, and the correspondence detecting meas detects, based on correlation of the image data of the predetermined lines, the corresponding point where the image data of the predetermined line output from the image reading means when the image is read again correspond to the image data of the predetermined lines held by the image data holding means, and the memory controlling means resumes writing the image data in the buffer from the image data at the corresponding point detected by the correspondence detecting means when the image is read again.

That is, when the overflow detecting means detects the overflow of the buffer, the image data holding means holds the image data of predetermined lines just before the overflow is detected. The image data detecting means does not detect the position of the image data when the overflow is detected among all transmitted image data. The overflow of the buffer is detected during the transmission of the image data, and the image is read again. Thereafter, the correspondence detecting means detects, based upon the correlation of the image data of the predetermined lines, the corresponding point when the image data of the predetermined lines output from the image reading means when the image is read again correspond to the image data of the predetermined lines. Thereby, when the image is read again, the image data position where the writing of the image data in the buffer is resumed can be accurately detected without depending on the reading accuracy.

In order to achieve the above-mentioned object, an image receiving device comprises: a communication controlling means for reading images and writing image data indicating the read images in a transmission buffer, and communicating with an image reading device sequentially reading image data from the buffer in an order in which the image data are written in the buffer, and transmitting and receiving a control signal; an overflow detecting means for detecting overflow of the buffer; an image memory for containing the image data; a memory controlling means for writing, in the image memory, image data received via the communication controlling means; an image data position detecting means for detecting a position of image data when the overflow is detected, among all received image data, when the overflow detecting means detects the overflow; a correspondence detecting means for detecting a correspondence point when image data transmitted from the image reading device when the images are read again correspond to image data at the image data position detected by the image data position detecting means; and in the present invention, when the overflow detecting means detects overflow of the buffer, the memory controlling means stops writing image data in the image memory, and resumes writing image data in the image memory from image data at the correspondence point detected by the correspondence detecting means when the images are read again.

That is, according to the present invention, the image receiving unit detects the overflow of the transmission buffer in the image reading device. When the overflow is detected, the writing of the image data in the image memory is stopped, and the image data position when the overflow is detected among all received image data is detected. Thereafter, the image reading device resumes reading the same image, and when the image data, which are transmitted when the images are read again, correspond to the image data at the image data position when the overflow is detected, the writing of the image data in the image memory is resumed from the image data at the corresponding point.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 5 is a block diagram showing essential parts of an embodiment of an image receiving device according to the present invention;

FIGS. 7(A) and 7(B) are views showing the structure of data transmitted from the image reading device;

FIG. 8 is a view showing another embodiment of an image receiving device according to the present invention;

DETAILED DESCRIPTION OF THE PREFERRED EMBODIMENTS

Figure 1:
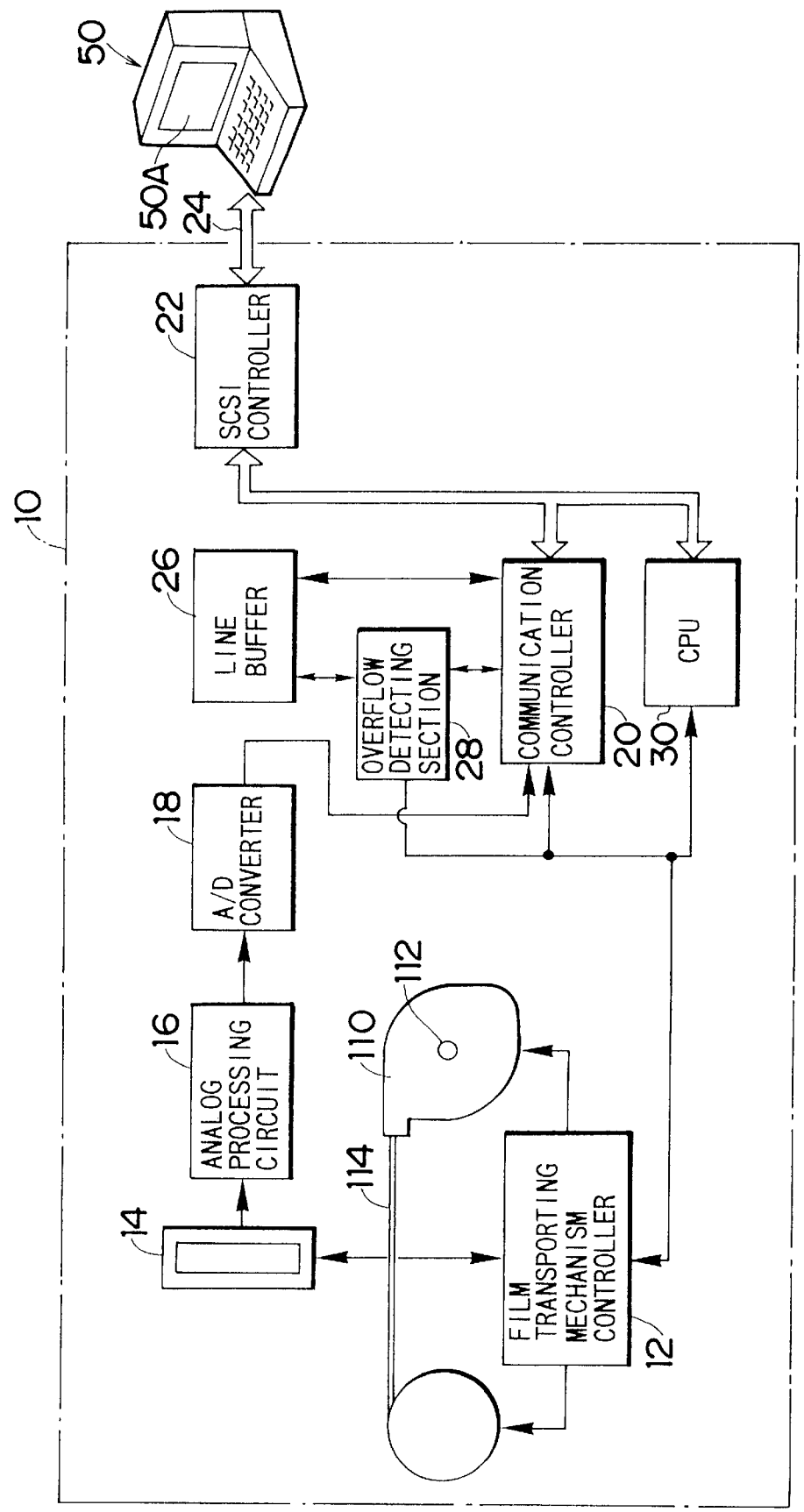
FIG. 1 is a view showing the whole structure of an embodiment of an image reading device according to the present invention.

FIG. 1 is a view showing the structure of an embodiment of an image reading device according to the present invention.

Figure 9:
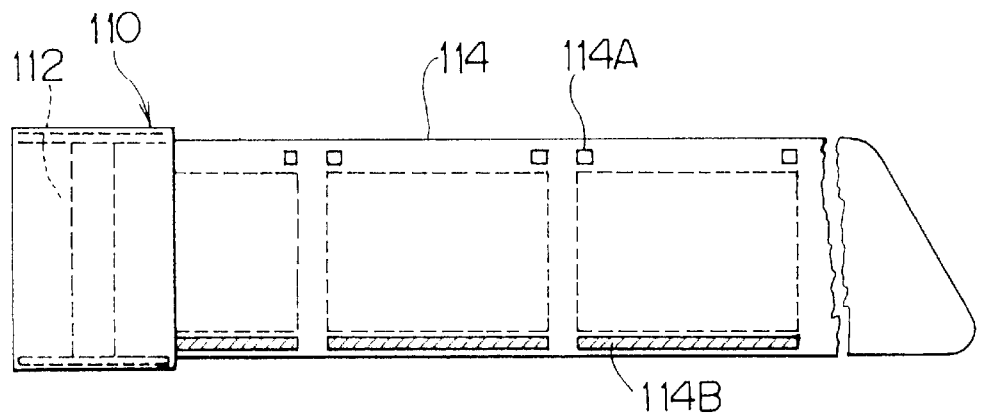
FIG. 9 is a view showing the structure of photographic film.
Figure 10:
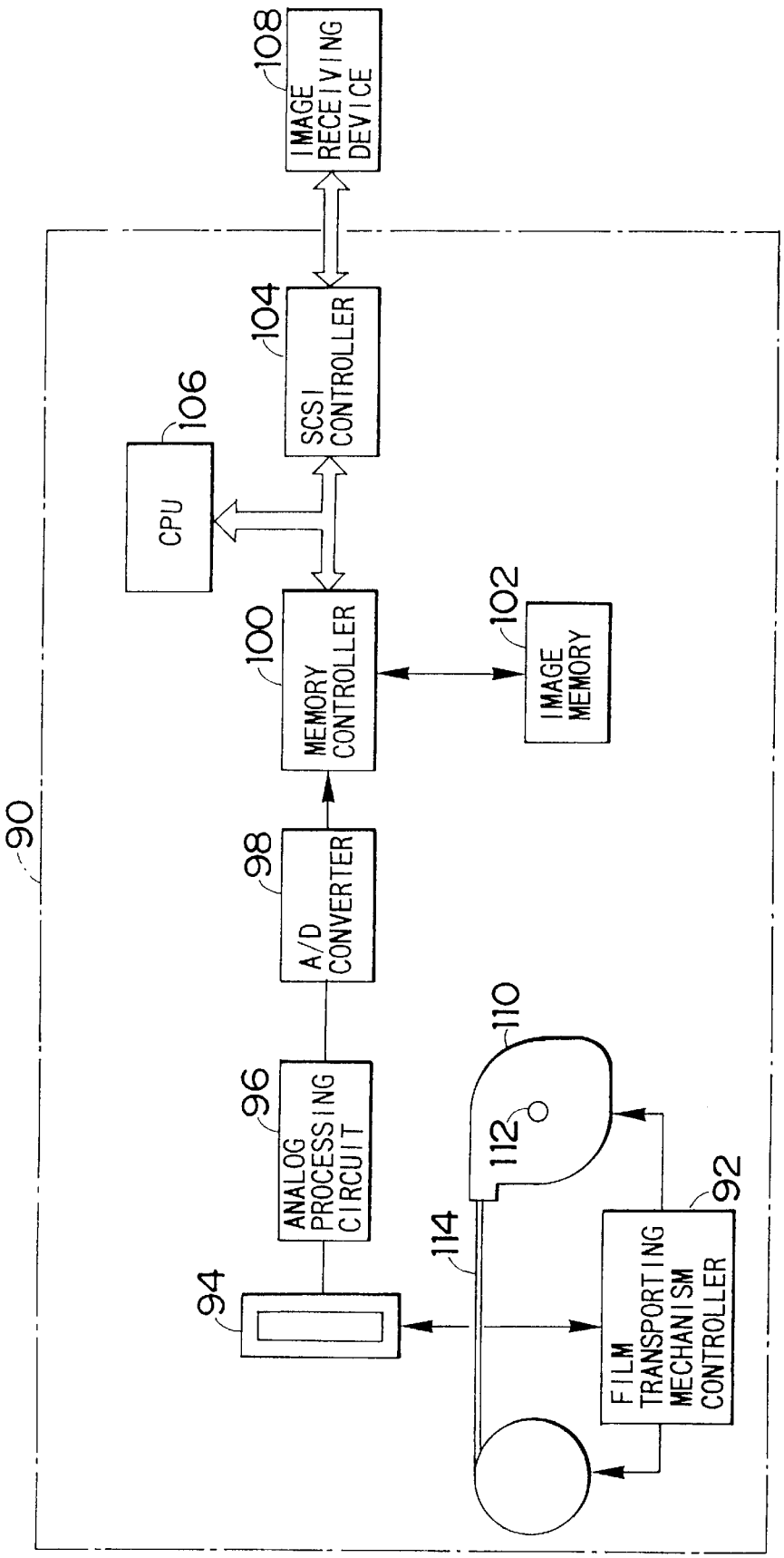
FIG. 10 is a view showing the whole structure of a conventional image reading device.

As shown in FIG. 1, the image reading device 10 according to the present invention controls transport direction and speed of developed photographic film 114 in FIG. 9 by means of a film transporting mechanism controller 12. The image reading device 10 transports the photographic film 114 in a predetermined direction (hereinafter referred to as an image pickup direction), and sequentially reads film images which are passing a predetermined line by a CCD line sensor 14. The image data of the read film images are output to an external image receiving device 50 such as a personal computer, so that the image data of the film image can be recorded in an external recording device (not shown), and the film image can be displayed on a monitor 50A of the image receiving device 50.

The image reading device 10 reads all the frame images, which are recorded on the photographic film, at a low resolution, and then the image reading device transfers the image data to the image receiving device. The frame images are displayed as an index image on the monitor 50A of the image receiving device 50. Then, a desired frame image is selected from the index screen, and only the selected frame image is transferred to the image receiving device as the image data of high resolution by the re-scanning. Or, all frame images may be read as image data of high resolution from the beginning, and the image data may be transferred to the image receiving device.

A variety of signal processing such as signal amplification are performed for the image data outputted from the CCD line sensor 14 shown in FIG. 1. An A/D converter converts the image data into digital signals. Then the image data converted into digital signals are input to a communication controller 20.

Figure 11:
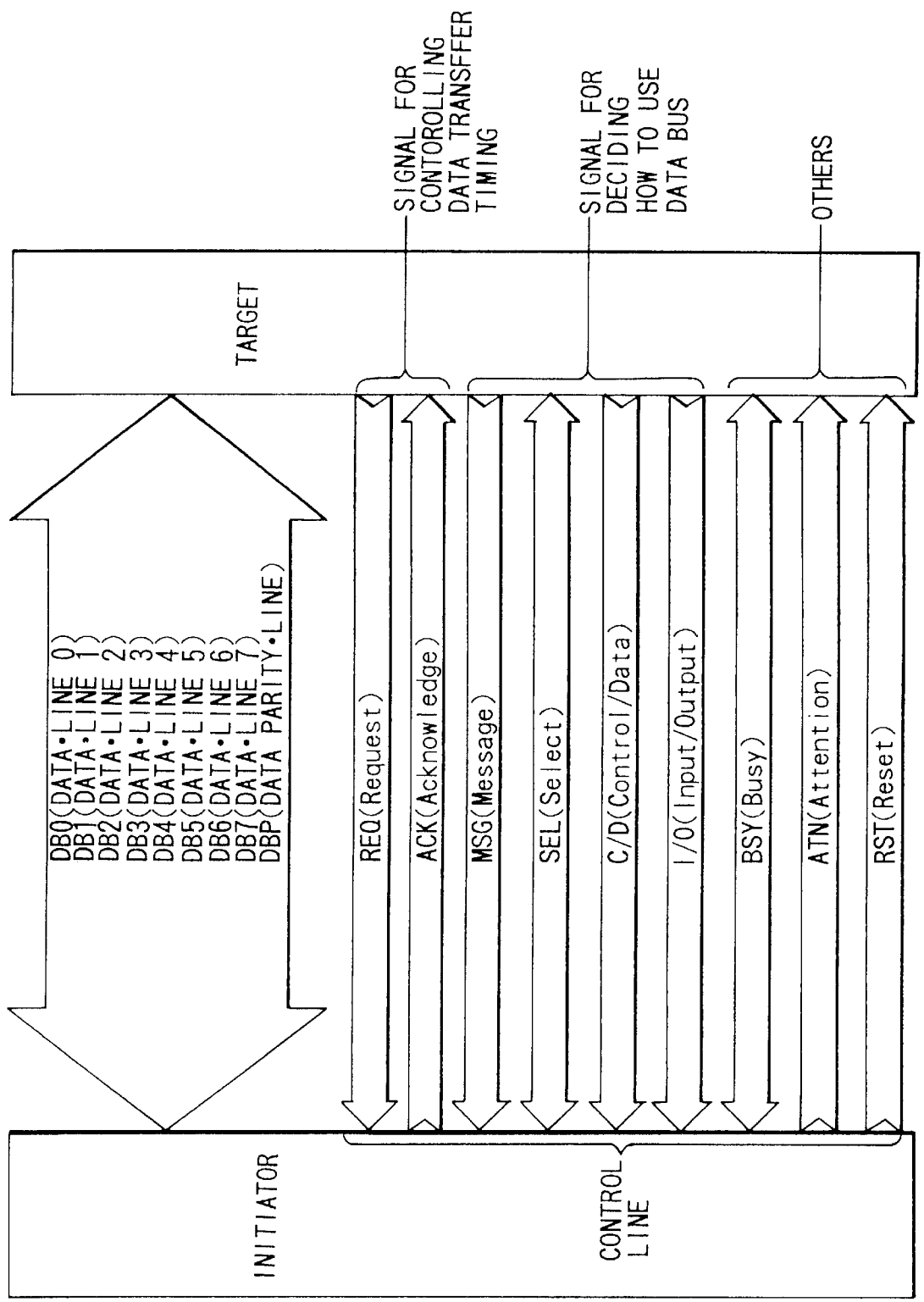
FIG. 11 is a view showing the structure of a SCSI bus.

The image data input to the communication controller 20 are output to a small computer system interface (SCSI) controller 22, and set in data buses DB0 through DB7 of a SCSI bus 24 (FIG. 11 illustrates the structure of the SCSI bus). When the image data are set in the SCSI bus 24, the SCSI controller 22 outputs a request (REQ) signal to the image receiving device 50.

On receipt of the REQ signal, the image receiving device 50 inputs the image data set in the SCSI bus 24, and transmits an acknowledge (ACK) signal, which indicates that the image data set in the SCSI bus 24 have been transferred, to the SCSI controller.

The SCSI controller 22 confirms that the image data have been transferred to the image receiving device 50 with the ACK signal. The SCSI controller 22 receives the next image data from the communication controller 20, and sets the image data in the SCSI bus 24 as described above. The above processing is repeated so that the image data can be sequentially transferred to the image receiving device 50.

If the image receiving device 50, which receives the image data, is performing another processing (busy state), the ACK signal is not sent back to the SCSI controller 22. In this case, the communication controller 20 stores the image data, which are sequentially output from the A/D converter 18, in a transmission line buffer 26. The line buffer 26 is composed of memory which is arranged one-dimentially for recording the image data in plural lines.

When the busy state of the image receiving device 50 is cancelled and the image receiving device 50 sends the ACK signal back to the SCSI controller 22, the communication controller 20 sequentially reads out the image data from the line buffer 26 in such an order that the image data are written in the line buffer 26. Then the communication controller 20 outputs the image data to the SCSI controller 22 and sets the image data in the SCSI bus 24.

However, if the busy state of the image receiving device 50 is not cancelled and the image data are accumulated in the line buffer 26, the memory capacity of the line buffer 26 can run short at one point (overflow). For this reason, an overflow detector 28 keeps track of the memory in according to the conditions of the line buffer 26. The overflow detector 28 outputs an overflow detecting signal indicating the overflow to the communication controller 20 just before the line buffer 26 overflows, and stops the writing of the image data in the line buffer 26.

On the other hand, the overflow detecting signal is output to the CPU 30, which outputs a control signal to each circuit in order to have each circuit rescan the frame images which are picked up when the overflow detecting signal is output. That is, the film transporting mechanism controller 12 rewinds the photographic film 114 up to the head of the frame image which is scanned when the overflow detecting signal is output. The film transport mechanism controller 12 starts transporting the photographic film 114 from the head of the frame image in an image pickup direction, and reads the image data of the frame image by the CCD line sensor 14 (re-scanning). While the film transporting mechanism controller 12 is rewinding the photographic film 114, the CCD line sensor 14, under control of the CPU 30, stops reading the image data, and starts reading the image data when the photographic film 114 is transported again from the head of the frame image in the image pickup direction.

Figure 2:
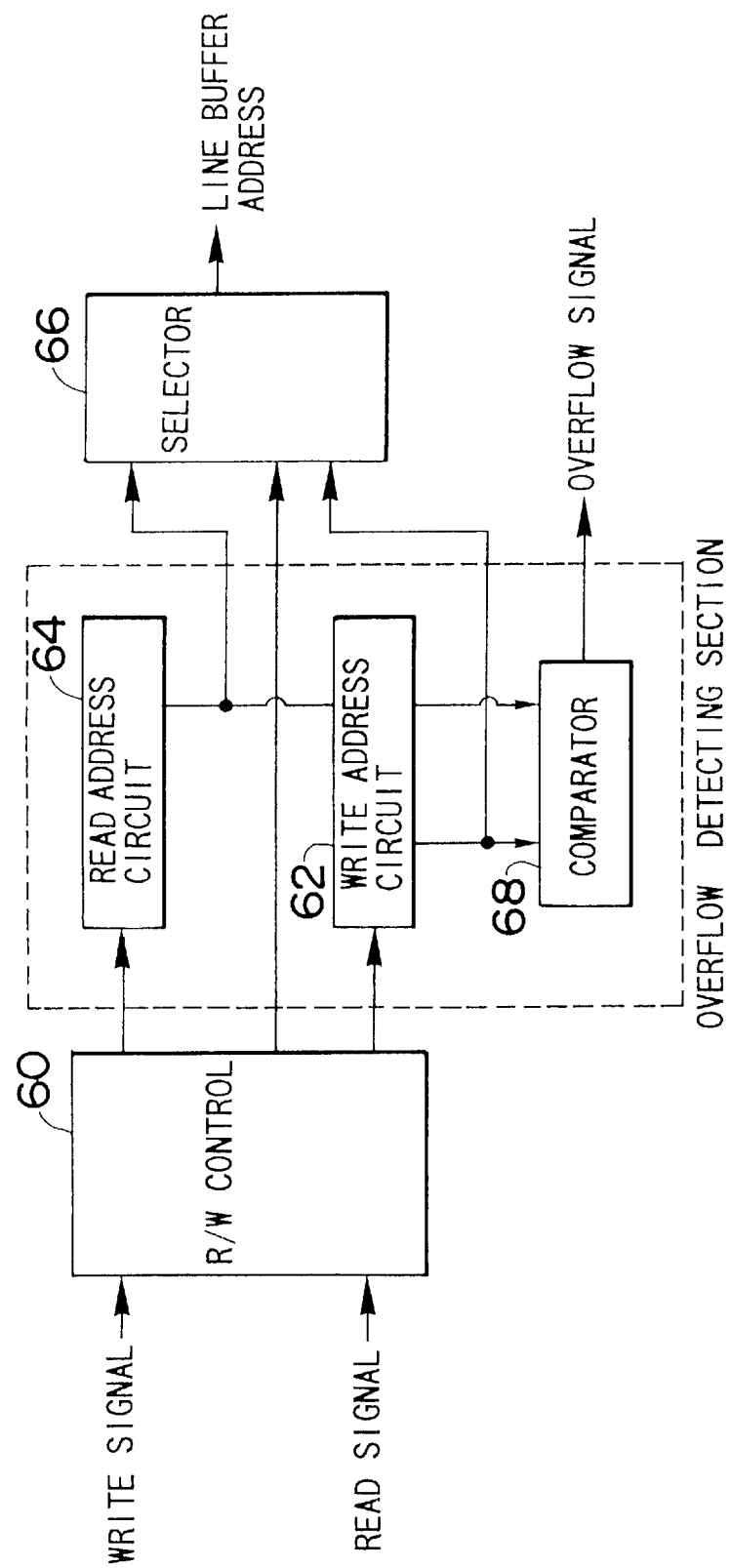
FIG. 2 is a block diagram showing the structure of an overflow detecting section.

FIG. 2 illustrates the structure of the overflow detector. The overflow detector 28 in FIG. 2 is incorporated with circuits for reading and writing the image data from and into the line buffer 26 in the communication controller 20.

As shown in FIG. 2, a R/W controller 60 receives a write signal or a read signal directing a timing of writing and reading the image data. On receipt of the write signal, the R/W controller 60 outputs a predetermined signal to a write address circuit 62, and increases a write address by 1. On the other hand, on receipt of the read signal, the R/W controller 60 outputs a predetermined signal to a read address circuit 64, and increases a read address by 1. That is, every time the image data are read or written, the R/W controller 60 increases the address of the memory in the line buffer 26, which reads and writes the image data, one by one.

The maximum values of these address values are set according to the memory capacity of the line buffer 26. When the address value reaches the maximum value, it is reset to be 0.

The address values of the write address circuit 62 and the read address circuit 64 are output to a selector 66. If the signal input to the R/W controller 60 is the write signal, the selector 66 outputs the write address to the line buffer 26, and if the signal input to the R/W controller 60 is a read signal, the selector 66 outputs the read address. Thus, the selector designates the address of the memory in the line buffer 26 which reads the writes the image data.

On the other hand, the write address circuit 62 and the read address 64 output the write address and the read address to a comparator 68, which compares these addresses. If the difference between the write address and the read address is less than a predetermined value, the comparator 68 outputs the overflow detecting signal.

That is, if the writing of the image data is unbalanced compared to the reading, the write address increases one-sidedly compared to the read address, and thereby the write address becomes close to the read address. When the write address corresponds to the read address, the line buffer 26 overflows, and the comparator 68 outputs the overflow detecting signal when the remaining number of memory is less than a predetermined number of memory (for example, the number of bytes of the image data of one pixel).

A detailed explanation will hereunder be given about the operation of the communication controller 20 in the case when the overflow detector 28 outputs the overflow detecting signal as stated above.

When the overflow detector 28 outputs the overflow detecting signal, the frame image which have already picked up are re-scanned. When the busy state of the image receiving device 50 is cancelled during the above re-scanning, the image data accumulated in the line buffer 26 are sequentially transferred to the image receiving device 50.

If the image data accumulated in the line buffer 26 are transferred to the image receiving device 50 as stated above, some capacity of the line buffer 26 is vacated. If the line buffer 26 has no data, the data transmission to the image reading device 50 is stopped.

On the other hand, the communication controller 20 detects the image data at a point where the overflow detecting signal is output from the image data read by the re-scanning, and resumes writing the image data in the line buffer 26, and thereby the data transmission resumes, too.

That is, the communication controller 20 detects the image data corresponding to the image data which cannot be recorded in the line buffer 26 at a point where the overflow detector 28 outputs the overflow detecting signal among the image data which are sequentially read out from the CCD line sensor 14 by the re-scanning. Then, the communication controller 20 sequentially records the image data, which are to be scanned after the above-mentioned image data, in the vacant memory in the line buffer 26.

Figure 3:
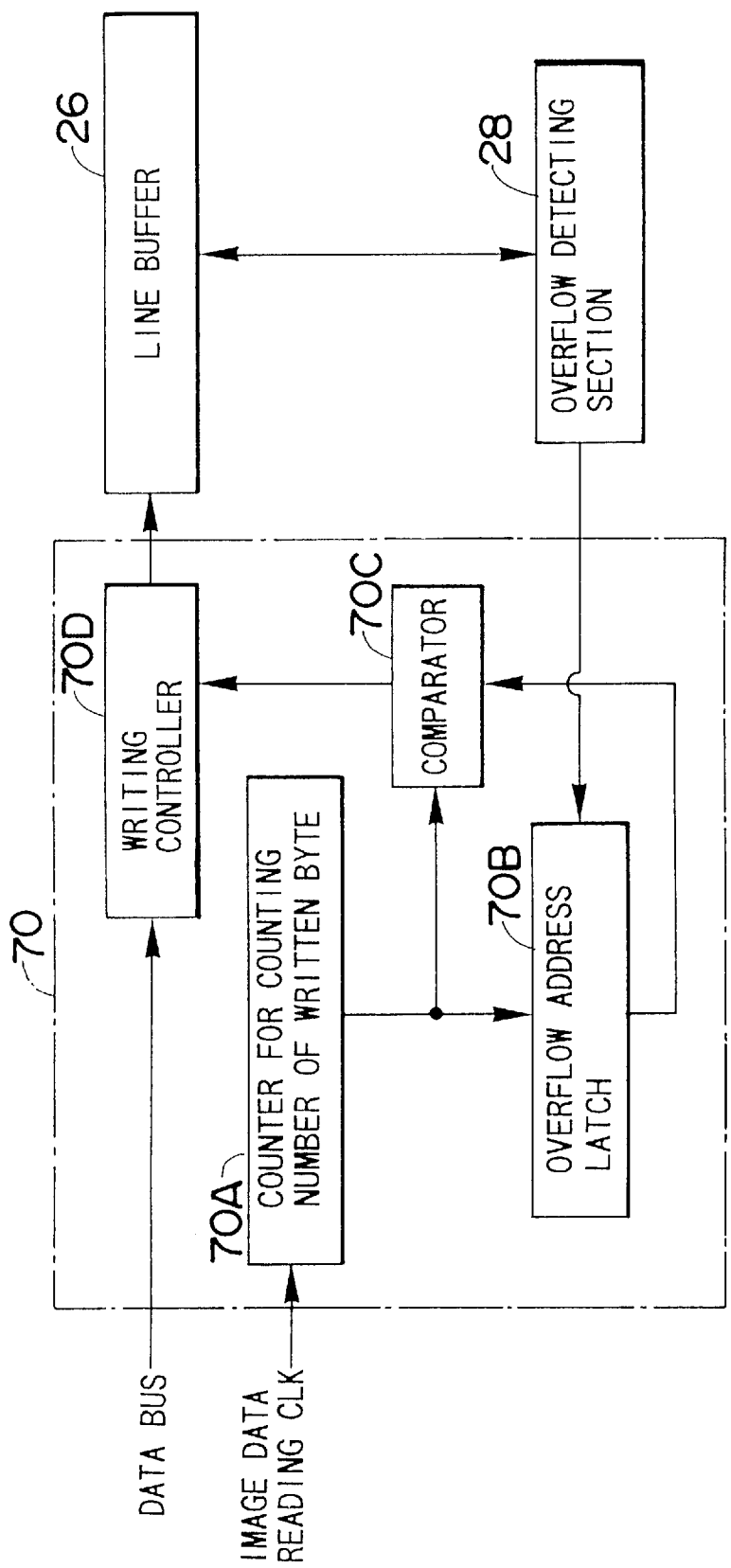
FIG. 3 is a block diagram showing an embodiment of an image data position detecting circuit.

FIG. 3 is a view showing the structure of an image data position detecting circuit for controlling the writing of the image data in the line buffer 26.

As shown in FIG. 3, the image data position detecting circuit 70 receives the overflow detecting signal outputted from the overflow detector 28, the image data outputted from the A/D converter 98 (the image data transmitted from the data bus), and a synchronous signal outputted from the CPU 30 (image data reading clock (CLK)).

A counter 70A for counting the number of written bytes in FIG. 3 counts the number of bytes beginning from the image data which are read at the start of reading of the image data at the head of each frame image up to the currently-read image data. The number of bytes counted by the counter 70A is output to an overflow address latch circuit 70B. A point when the reading of the image data starts at the head of the frame image is decided according to the point when the perforation 114A (see FIG. 9) indicating the position of each frame is detected.

On receipt of the overflow detecting signal from the overflow detector 28, the overflow address latch circuit 70B holds the number of bytes outputted from the counter 70A. The number of bytes indicates the position of the image data at a point when the overflow detector 29 outputs the overflow detecting signal.

When the overflow detector 28 outputs the overflow detecting signal and the re-scanning of the frame image is executed, a comparator 70C compares the number of bytes outputted from the counter 70A with the number of bytes stored in the overflow address latch circuit 70B. When the number of bytes becomes equal, the comparator 70C outputs the write signal to a writing controller 70D, and has the writing controller 70D resume writing the image data in the line buffer 26.

If the overflow detector 28 has not output the overflow detecting signal, the writing controller 70D records the image data input from the data bus to the line buffer 26. When the overflow detector 28 outputs the overflow detecting signal, the writing controller 70D stops the writing of the image data in the line buffer 26. Then, on receipt of the write signal from the comparator 70C, the writing controller 70D resumes writing the image data in the line buffer 26, from the image data input from the data bus.

As stated above, even if the line buffer 26 overflows, the continuous image data in the frame images are sequentially written in the line buffer 26 by the re-scanning, so that the image data transferred to the image receiving device 50 is prevented from overlapping and missing.

In the image data position detecting circuit 70, the image data are handled with a byte (a pixel) as a unit, however, the image data may be handled with a line as a unit. That is, when the image data of one line read out from the CCD line sensor 14 are recorded in the line buffer 26, and if the remaining memory capacity in the line buffer 26 is less than the number of bytes in the image data of one line, the overflow detector 28 outputs the overflow detecting signal. Every time the image data of one line are read out from the head of the frame image, the image data position detecting circuit 70 counts the number of lines of the image data read out from the CCD line sensor 14, and detects the image data position of the image data read out from the CCD line sensor 14 in view of the number of lines. Then, the image data position detecting circuit 70 detects the image data position where the writing of the image data is resumed in the line buffer 26 during the re-scanning.

In this case, the circuits such as the overflow address latch circuit 70B, the comparator 70C can be more compact.

Figure 4:
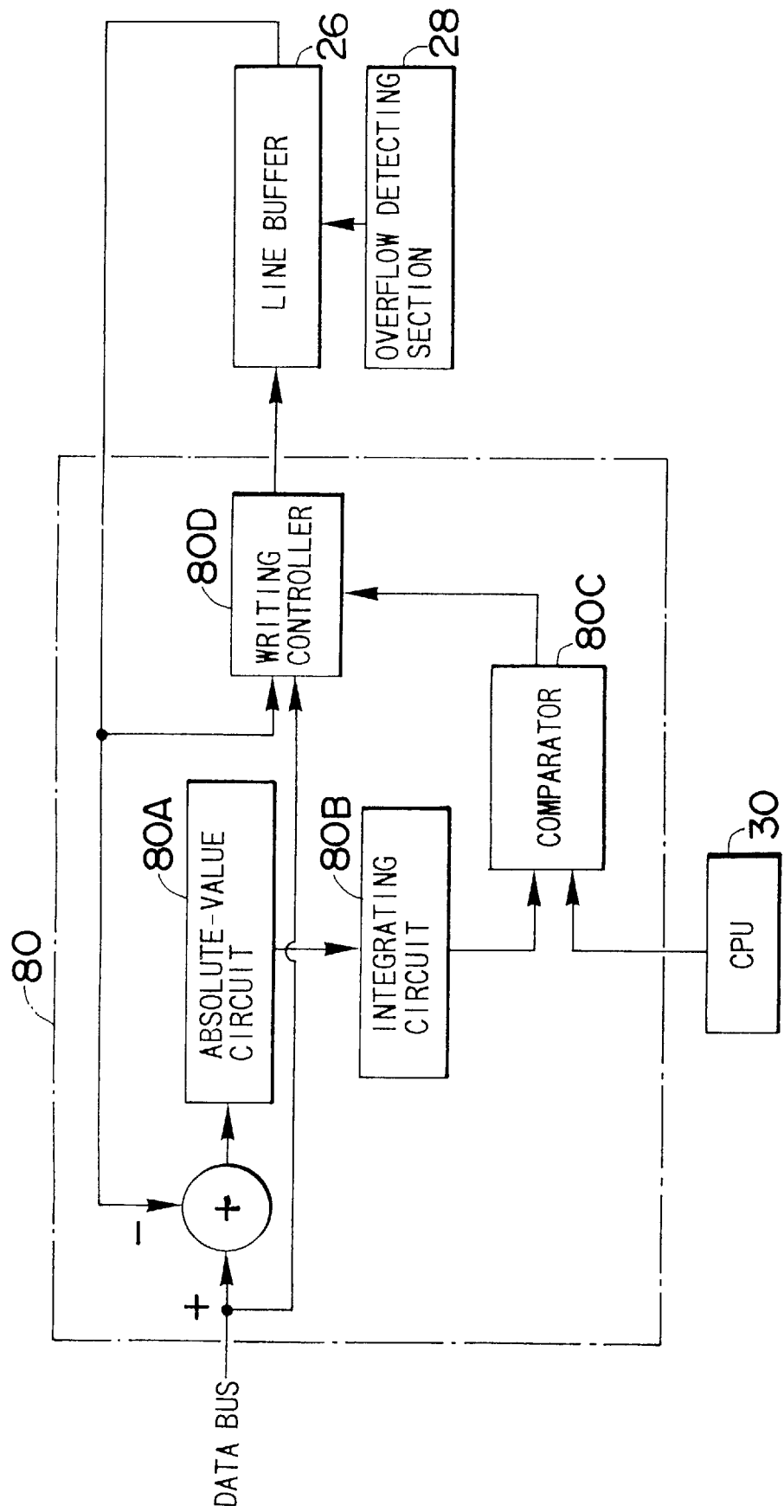
FIG. 4 is a block diagram showing another embodiment of an image data position detecting circuit.

FIG. 4 shows the structure of another embodiment of the image data position detecting circuit.

The image data position detecting circuit 80 detects the image data in the case when the overflow detector 28 outputs the overflow detecting signal in view of the number of bytes or the number of lines of the image data counted from the head of the frame image. If a DC motor is used as a motor for controlling the transport of the film, however, the positional accuracy in the transport direction is not satisfactory. For this reason, even if the address values (the number of bytes or lines) of the image data which are read out during the first scanning and the re-scanning are the same, the readout positions on the frame image (image data position) are not always the same. Thus, the image data position detecting circuit 80 in FIG. 4 detects the same image data in view of the correlation between the image data.

That is, when the overflow detecting circuit 28 outputs the overflow detecting signal to execute the re-scanning, an absolute-value circuit 80A in FIG. 4 sequentially reads out the image data of one line, which are recorded in the line buffer 26 just before the overflow detecting signal is output, and the circuit 80A finds, for every byte, the absolute value of the difference between the readout image data and the image data inputted from the data bus.

The values are input to the integrating circuit 80B, which integrates the input values with regard to the image data of one line. The smaller the value (integrated value), which is integrated by the integrating circuit 80B, is, the closer the image data of the line buffer 26 and the image data input from the data bus become.

The comparator 80C receives the integrated value from the integrating circuit 80B, and compares the receipt integrated value with a predetermined threshold outputted from the CPU 30. When the value outputted from the integrating circuit 80B is less than a predetermined threshold (that is, the image data positions are the same), the comparator 80C outputs the write signal to a writing controller 80D, and has the writing controller 80D resume writing the image data in the line buffer 26.

If the overflow detector 28 has not output the overflow detecting signal, the writing controller 80D records the image data, which are inputted from the data bus, in the line buffer 26. When the overflow detector 28 outputs the overflow detecting signal, the writing controller 80D stops the writing of the image data in the line buffer 26.

During the re-scanning, the writing controller 80D receives the image data which are input to the absolute-value circuit 80A from the line buffer 26, and records the image data again in the line buffer 26 and holds the image data in the line buffer 26. When receiving the write signal from the comparator 80C, the writing controller 80D records the image data, which is input from the data bus, in the line buffer 26.

As stated above, the image data position detecting circuit 80 detects the position where the image data on the frame images are read when the overflow detecting signal is output based on the correlation of the image data, and thereby the image data position detecting circuit 80 can accurately detect the position regardless of the accuracy in transporting the film.

In this embodiment, the correlation is found by the image data of one line; however, if the correlation is found by the image data of plural lines, the image data position can be accurately detected.

Moreover, in this embodiment, when the overflow detecting signal is output to execute the re-scanning, the film is rewound up to the head of the frame image. If the position is detected based on the correlation as stated above, the film does not have to be rewound up to the head of the frame image. For example, when the overflow detecting signal is output, the re-scanning may start at a position where the photographic film has been rewound by a predetermined length.

Furthermore, the above-described image reading device may be applied to another apparatus which reads not only a transmission manuscript such as photographic film but also a reflection manuscript such as a photograph. Moreover, the image reading device is not restricted to one which scans the manuscript by the line sensor. The image reading device may be applied to a device which reads the image by an area sensor and sequentially transfers the read image.

FIG. 5 is a block diagram showing the essential parts of an embodiment of the image receiving device according to the present invention.

The image receiving device 200 is constructed in such a manner that an overflow detector 208, an overflow address latch circuit 210, a comparator 212, etc. are added to a personal computer operated by a multitask operation system (OS), etc. The personal computer is provided with a SCSI controller 202 as an I/O interface for connecting to an external device. A hard disk which has a large capacity, a semiconductor memory, etc. are used for an image memory 206.

Figure 6:
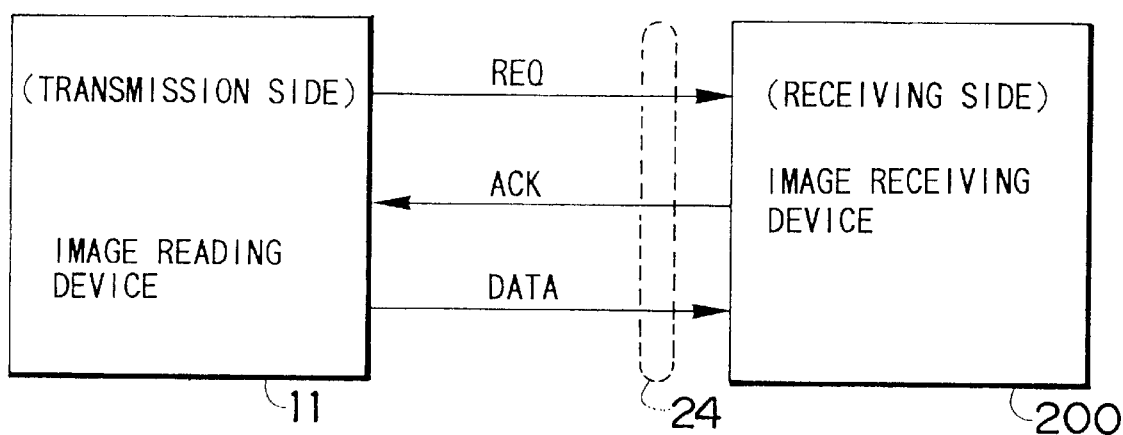
FIG. 6 is a view showing another embodiment in which the overflow is detected in the image receiving device.

On receipt of the REQ signal from the image reading device 11 as shown in FIG. 6, the image receiving device 200 receives the data set in the SCSI bus 24, and sends back the ACK signal indicating that the image receiving device has received the data set in the SCSI bus 24. The data transmitted from the image reading device 11 includes the addresses added to each line data as shown in FIG. 7(A) for example.

The line data received as stated above are written in the image memory 206 via a memory controller 204, and the address is sent to the overflow detector 208, the overflow address latch circuit 210, and the comparator 212. The overflow detector 208 checks the continuity of the sequentially-input addresses. If the addresses are not continuous, the overflow detector 208 determines that the buffer in the image reading device 11 overflows, and outputs the overflow detecting signal to the memory controller 204, the overflow address latch circuit 210, and the CPU 214. On receipt of the overflow detecting signal, the memory controller 204 stops the writing of the line data when the addresses of the line data are not continuous. On receipt of the overflow detecting signal, the overflow address latch circuit 210 latches the address of the line data just before the line data whose address is not continuous.

On the other hand, the CPU 214 unitedly controls each circuit in the image receiving device 200. On receipt of the overflow detecting signal, the CPU 214 makes the image reading device 11 re-scan the frame image which is picked up when the overflow is detected, and outputs a resend require signal for resending the data of the frame image.

When the image reading device 11 resends the line data of the re-scanned film image, the address of the line data is sent to the comparator 212. The address of the line data just before the line data whose address is not continuous is added to the other input of the comparator by the overflow address latch circuit 210. The comparator 212 compares these two addresses, and if they correspond to each other, the comparator 212 resumes writing the line data in the image memory 206, beginning from the line data of the corresponding address.

Thus, even if the line buffer in the image reading device 11 overflows, the image receiving device 200 can capture the desired image data without overlapping or missing parts. There is no need to provide the overflow detector and the image memory of large capacity in the image reading device 11.

The overflow detector 208 determines that the line buffer in the image reading device 11 overflows based upon a point when the address added to the line data is not continuous; however, the present invention is not limited to this. If the REQ signal is not input within a predetermined time after the image receiving device 200 outputs the ACK signal, the overflow detector 208 may determine that the line buffer in the image reading device 11 overflows.

Moreover, as shown in FIG. 11, the parity of the one-byte data is checked based upon the parity bit of the data parity line DBP. If there is a parity error, it is determined that the communication error has taken place. The address of the communication error is stored, and resending of the data may be required as is the case when the overflow is detected, and when the data is received again, the writing of the data may be resumed from the data in which the communication error takes place. If the LRC indicating the parity value in the vertical direction is added to each line data which is transmitted from the image reading device 11, the LRC character is utilized to correct the parity errors. However, if there are too many parity errors and the parity errors cannot be corrected, it may be determined that the communication error has taken place in the line data.

The image receiving device 200 in FIG. 5 has a correspondence detecting means consisting of the overflow address latch circuit 210 and the comparator 212; however, the correspondent detecting means may be provided in the image reading device as shown in FIG. 8. In this case, when detecting the overflow (including the communication error), the image receiving device 201 transmits an error address to the image reading device 13. The image reading device 13 compares the address, which is resent under the resend requirement of the image receiving device 201, with the error address. The image reading device 13 resends the data at a position where the address of the resent data corresponds to the error address (or a position corresponding to the error address), and the image receiving device 201 contains the resent data continuously to the previously-received data.

As set forth hereinabove, according to the image reading device of the present invention, when the overflow of the transmission buffer is detected during the transmission of the image data, the writing of the image data in the buffer is stopped, and then the image is read again, and the writing of the image data in the buffer is resumed beginning from the image data at the position when the overflow is detected. Thus, even if the communication overflows takes place during the transmission of the image data, all the image data without missing parts can be transmitted to the external image receiving device. The image reading device does not require an image memory for recording all image data of the image, so that the image reading device can be inexpensive.

Furthermore, according to the image receiving device, when the overflow of the transmission buffer in the image reading device is detected, the writing of the image data in the image memory is stopped and the reading of the same image is resumed. When the image data, which are transmitted when the image is read again, corresponds to the image data when the overflow is detected, the reading is resumed from the image data at the corresponding position. Thus, there is no need to provide the image reading device with the image memory for recording all image data of the image.

It should be understood, however, that there is no intention to limit the invention to the specific forms disclosed, but on the contrary, the invention is to cover all modifications, alternate constructions and equivalents falling within the spirit and scope of the invention as expressed in the appended claims.

I claim:

1. An image reading device comprising:

image reading means for reading images and outputting image data indicating the read images;

a buffer for transmission and temporarily containing the image data outputted from said image reading means;

overflow detecting means for detecting overflow of said buffer;

communication controlling means including a buffer controlling section for writing, in said buffer, the image data outputted from said image reading means and sequentially reading out the image data from said buffer in an order in which said image data are written in said buffer, and communicating with an external image receiving device to transmit said image data to said image receiving device via said buffer;

image data position detecting means for detecting an image data position when said overflow is detected among all transmitted image data, when said overflow detecting means detects said overflow of said buffer;

controlling means for having said image reading means resume reading the same image as said read image, when said overflow detecting means detects said overflow of said buffer;

correspondence detecting means for detecting a corresponding point where the image data outputted from said image reading means correspond to image data at said image data position detected by said image data position detecting means; and wherein said buffer controlling section stops writing the image data in said buffer when said overflow detecting means detects the overflow of said buffer, and resumes writing the image data in said buffer from the image data at said corresponding point detected by said correspondence detecting means when said images are read again.

2. The image reading device as defined in claim 1, wherein said image reading means outputs image data of a desired resolution by decreasing or increasing image data.

3. The image reading device as defined in claim 1, wherein said image reading means has a line sensor, and a driving mechanism for relatively moving said line sensor and a transmission manuscript or a reflection manuscript in a feeding direction.

4. The image reading device as defined in claim 1, wherein said overflow detecting means detects said overflow if a remaining capacity of memory in said buffer is less than one pixel or a predetermined number of pixels when image data of each pixel output from said image reading means are written in said buffer; and said image data position detecting means counts, on a pixel-by-pixel basis, image data sequentially output from said image reading means, and detects said image data position when said overflow is detected based on the counted value.

5. The image reading device as defined in claim 1, wherein said overflow detecting means detects said overflow if a remaining capacity of memory in said buffer is less than one line or a predetermined number of lines when image data of each line output from said image reading means are written in said buffer; and said image data position detecting means counts, on a line-by-line basis, image data sequentially output from said image reading means, and detects said image data position when said overflow is detected based on the counted value.

6. An image reading device comprising:

image reading means for reading images and outputting image data indicating the read images;

a buffer for transmission and temporarily containing the image data output from said image reading means;

overflow detecting means for detecting overflow of said buffer;

communication controlling means including a buffer controller for writing the image data output from said image reading means in said buffer and sequentially reading out the image data from said buffer in an order in which the image data are written in said buffer, said communication controlling means communicating with an external image receiving device and transmitting image data to said image receiving device via said buffer;

image data holding means for holding image data of predetermined lines just before said overflow is detected when said overflow detecting means detects said overflow of said buffer;

controlling means for having said image reading means resume reading the same image as said read image when said overflow detecting means detects said overflow of said buffer;

correspondence detecting means for detecting a corresponding point when image data of predetermined lines output from said image reading means correspond to image data of said predetermined lines held by said image data holding means based upon correlation between said image data of said predetermined lines; and wherein when said overflow detecting means detects said overflow of said buffer, said buffer controller stops writing image data in said buffer, and resumes writing image data in said buffer from image data at said corresponding point detected by said correspondence detecting means when said images are read again.

7. An image receiving device comprising:

communication controlling means for reading images and writing image data indicating the read images in a buffer for transmission, and communicating with an image reading device sequentially reading image data from said buffer in an order in which said image data are written in said buffer, and transmitting and receiving a control signal;

overflow detecting means for detecting overflow of said buffer;

image memory for containing said image data;

memory controlling means for writing, in said image memory, image data received via said communication controlling means;

image data position detecting means for detecting an image data position when said overflow is detected, among all received image data, when said overflow detecting means detects said overflow;

correspondence detecting means for detecting a corresponding point when image data transmitted from said image reading device when said images are read again correspond to image data at said image data position detected by said image data position detecting means; and wherein when said overflow detecting means detects overflow of said buffer, said memory controlling means stops writing image data in said image memory, and resumes writing image data in said image memory from image data at said corresponding point detected by said correspondence detecting means when said images are read again.

8. The image receiving device as defined in claim 7, wherein said image reading device transmits an address as well as said image data, and said overflow detecting means detects overflow of said buffer based upon a point when an address starts being not continuous.

9. The image receiving device as defined in claim 8, wherein said correspondence detecting means contains an address just before an address starts being not continuous, and detects a corresponding point when the stored address corresponds to an address of image data transmitted from said image reading device when said images are read again.

10. The image receiving device as defined in claim 7, wherein if said overflow detecting means receives no request signal within a predetermined time after transmitting an acknowledge signal to said image reading device, said overflow detecting means determines that said buffer overflows.

11. The image receiving device as defined in claim 10, wherein said correspondence detecting means stores an address of image data when said overflow is detected, and detects a point when said stored address corresponds to an address of image data transmitted from said image reading device when said images are read again.

12. An image reading device comprising:

communication controlling means for reading images and writing image data indicating the read images in a buffer, and communicating with an image reading device sequentially reading out the image data from said buffer in an order that the image data are written in said buffer so as to receive said image data and transmit and receive a control signal;

communication detecting means for detecting communication errors in communication with said image reading device;

image memory for containing said image data;

memory controlling means for writing image data received via said communication controlling means in said image memory;

image data position detecting means for detecting an image data position when said communication error is detected among all received image data when said communication error detecting means detects said communication error;

controlling means for having said image reading device resume reading the same image as said read image, when said communication error detecting means detects said communication error;

correspondence detecting means for detecting a corresponding point when image data transmitted from said image reading device when said images are read again correspond to image data at said image data position detected by said image data position detecting means; wherein when said communication error detecting means detects said communication error, said memory controlling means stops writing image data in said image memory, and resumes writing image data in said image memory from image data at said corresponding point detected by said correspondence detecting means when said images are read again.

13. The image receiving device as defined in claim 12, wherein said image reading device transmits parity check data as well as said image data, and said communication error detecting means detects communication errors by checking parity of said image data.

14. The image receiving device as defined in claim 13, wherein said correspondence detecting means contains an address of image data in which said communication error has taken place, and detects a point when said contained address corresponds to an address of image data transmitted from said image reading device when said images are read again.

* * * * *